United States Patent
Dougherty

[11] Patent Number: 6,029,712
[45] Date of Patent: Feb. 29, 2000

[54] CHEMICAL AND BIOLOGICAL AGENT RESISTANT HOSE FOR GAS TRANSMISSION AND PERSONNEL PROTECTION

[76] Inventor: Robert C. Dougherty, 937 W. Los Alamos, Tucson, Ariz. 85704

[21] Appl. No.: 08/989,965

[22] Filed: Dec. 12, 1997

[51] Int. Cl.[7] .............................. F16L 9/14; F16L 11/00; C09K 11/06
[52] U.S. Cl. .......................... 138/141; 138/125; 138/137; 510/274
[58] Field of Search ........................... 264/248; 428/517; 174/48; 510/274; 138/125, 137, 141

[56] References Cited

U.S. PATENT DOCUMENTS

| | | | |
|---|---|---|---|
| 4,135,055 | 1/1979 | Beckers et al. | 174/48 |
| 5,145,628 | 9/1992 | Karg et al. | 264/248 |
| 5,286,576 | 2/1994 | Srail et al. | 428/517 |
| 5,670,469 | 9/1997 | Dingus et al. | 510/274 |

Primary Examiner—Andres Kashnikow
Assistant Examiner—Davis Hwu
Attorney, Agent, or Firm—Mark E. Ogram P.C.

[57] ABSTRACT

A hose and wire casing adapted to withstand biological and chemical attacks. The hose/wire casing is manufactured by placing a barrier wrap of elastomer and ultra-high-molecular-weight-polyethylene around a hose body or conductor bundle. The two parts are then cured into a single unit using high temperature and high pressure. The combination of high temperature and high pressure minimize the porosity of the high-molecular-weight-polyethylene. The resulting hose/wire casing is particularly immune to chemical and biological attacks by an enemy and is easily cleaned of such agents using a variety of cleansing and neutralizing agents such as DS2, bleach, and strong bases. This cleaning results in a hose which may be handled safely with bare hands after decontamination.

16 Claims, 3 Drawing Sheets

CHEMICAL AND BIOLOGICAL AGENT RESISTANT HOSE FOR GAS TRANSMISSION AND PERSONNEL PROTECTION

BACKGROUND OF THE INVENTION

This invention relates generally to hoses and more particularly to hoses adapted to resist biological and chemical attacks.

Chemical and/or biological warfare represents an extreme threat to both military and civilian personnel in any future conflict. The 1991 Persian Gulf War verifies that as many as 20,000 troops may have been exposed to chemical warfare agents which were drifting at low levels in the air.

This fact, in conjunction with the requirement that the troops be supplied with water by the tactical water distribution system (TWDS) in conjunction with the reverse osmosis water purification units (ROWPU), created a potential danger for the troops.

Besides the TWDS, a great number of other hoses were placed "at risk" by the chemical and biological attacks. These included oxygen lines used in air-craft, gas mask hoses, and other ventilation mechanisms.

Without proper protection, troops are at extreme risk to these types of attacks. Even further, once deployed, TWDS hoses must be either de-contaminated before use or discarded since even trace residual elements of a chemical or biological agent can be deadly to personnel handling them.

There exists a great need for a hose which was resistant to chemical and biological attack and which could be easily cleaned without causing the hose to degrade.

SUMMARY OF THE INVENTION

The invention is a hose and wire casing which is adapted to withstand biological and chemical attacks.

In this regard, the invention contemplates use for the communication of gas such as oxygen. The hose of the present invention is durable and is able to withstand attacks by either biological or chemical agents. Further the hose of this invention allows cleaning or "de-contaminating" operations to be performed on the hose without a degradation of the hose itself.

The hose is manufactured by placing a barrier wrap of ultra-high-molecular-weight-polyethylene around a hose body. This wrap and the hose body itself are un-cured. In the preferred embodiment, the barrier wrap is thin, being in the range of 0.005–0.025 inches thick.

The two uncured parts are then cured into a single unit using high temperature and high pressure. In the preferred curing operation, temperatures in excess of three hundred degrees Fahrenheit is applied; and, the pressure applied during curing is in excess of one hundred fifty pounds per square inch.

The combination of high temperature and high pressure minimize the porosity of the high-molecular-weight-polyethylene. The resulting hose is particularly immune to chemical and biological attacks by an enemy and is easily cleaned of such agents using a variety of cleansing and neutralizing agents such as DS2, bleach, and strong bases.

The hose on this invention is particularly useful for protection of ventilation hoses (i.e. gas masks and aviator oxygen feeds) as well as other such hoses. Since the hose is readily cleaned of the contaminates, the useful life of the hose is extended immeasurably.

The hose, as configured above, has a variety of attributes. The hose of this invention is able to:

a) Withstand 24 hours of liquid mustard agent attack without breakthrough; and, b) Capable of decontamination using DS2 decontaminate without damage to the covering, and resulting in the ability to safely handle the decontaminated item with bare hands.

The laminate or barrier cover is composed of a specially formulated elastomer covered with a thin (0.005"–0.015") layer of ultra-high-molecular-weight-polyethylene (UHMWPE). During fabrication, the hose body and the elastomer are uncured. The elastomer and the UHMWPE are wrapped around the hose body.

In one embodiment of the invention, the hose body/ UHMWPE is then wrapped with curing (shrink) tape.

The uncured assembly is then put in an autoclave to cure under high temperature (300 degrees fahrenheit or better) and high pressure (150 PSI). In this manner, all of the hose components (hose body, UHMWPE, and shrink tape) cure together as one piece, with the temperature and pressure compressing and melting the UHMWPE. This curing technique removes the porosity of the resulting hose and forms one compact unbroken chemical and biological resistant outer skin.

Power and electrical cables are also subject to the protection provided by the present invention. While the chemical and biological attack does not necessarily jeopardize the electrical conductivity, the present invention provides for an easy and simple method for assuring that the outer casing of the wire is free of danger, thereby allowing the individual the ability to safely handle the wire.

The invention, together with various embodiments thereof, will be more fully explained by the accompanying drawings and the following description.

DRAWINGS IN BRIEF

FIGS. 1A, 1B, 1C, and 1D illustrate the preferred method for the manufacture of a hose embodying this invention.

DRAWINGS IN DETAIL

FIGS. 1A, 1B, 1C, and 1D illustrate the preferred method for the manufacture of a hose embodying this invention.

An uncured hose body 10 is selected. The material of the uncured hose body 10 is selected such that once cured, the interior of the hose will not react with the liquid or gas to be communicated through the hose.

An uncured barrier wrap 11 is positioned around the uncured hose body 10. Uncured barrier wrap 11 includes an elastomer and ultra-high-molecular-weight-polyethylene and is preferably chosen such that the polarity of the uncured barrier wrap 11 approximates the polarity of an elastomer also contained within the uncured barrier wrap 11.

In the preferred embodiment, barrier wrap 11 is less than 0.025 inches thick.

In some embodiments of the invention, curing wrap 12 is then placed around the assembly of hose body 10 and barrier wrap 11.

Figure 1A:
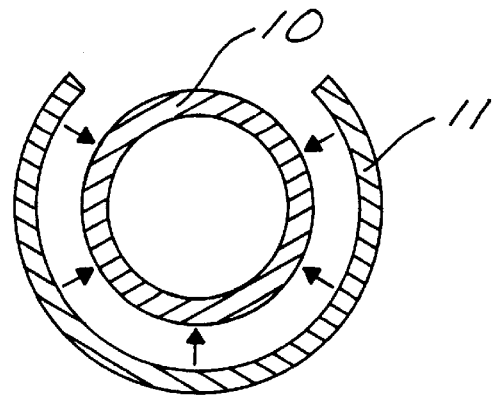
Figure 1B:
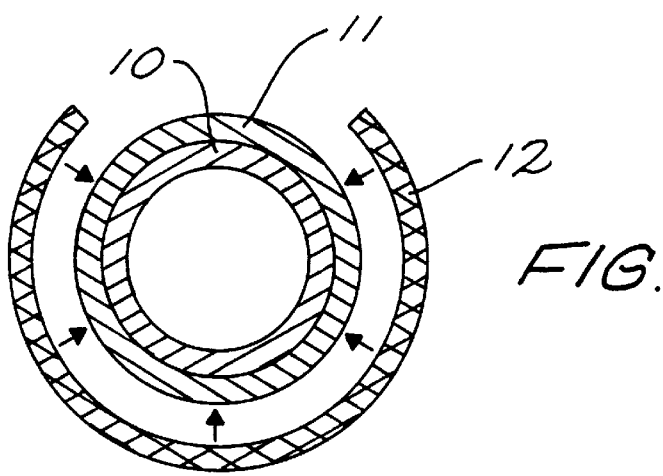
Figure 1C:
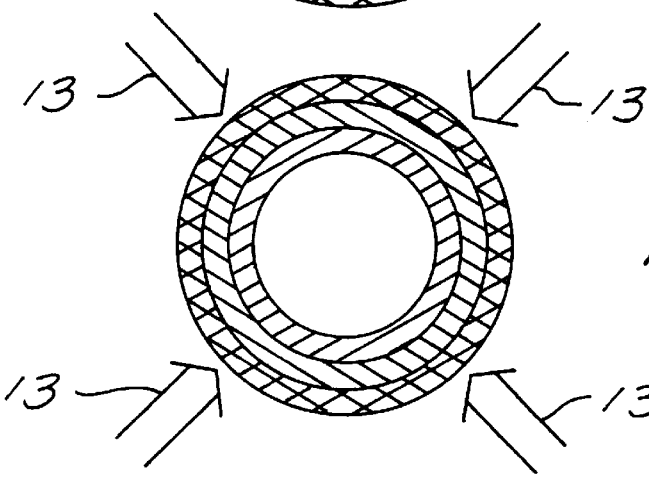
Figure 1D:
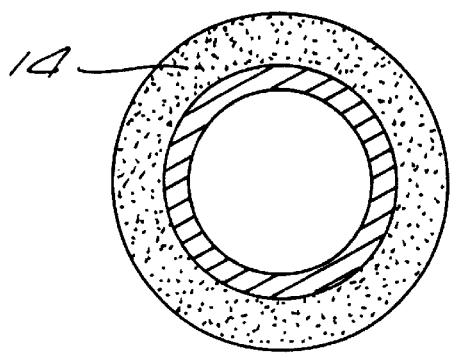

This assembly, FIG. 1C, is then subjected to a curing process 13 where high temperature and high pressure are applied. In the preferred embodiment, the temperature of curing process 13 is in excess of three hundred degrees Fahrenheit and the pressure applied is in excess of one hundred fifty pounds per square inch.

Curing process 13 is designed to melt and compress the uncured barrier wrap 11 and the uncured hose body 10. This melting and compression results in a single blended hose 14 which is practically devoid of cavities so that blended hose 14 is easily decontaminated.

The hose of the present invention utilizes an outer covering which resists the penetration of chemical and/or biological agents, such as liquid mustard, mustard gas, VX, GD, ANTHRAX, Etc for a minimum of 24 hours.

Preferably, the hose has an outer covering which is a laminate of UHMWPE and various elastomers, including but not limited to silicone, neoprene, butyl, EPDM, natural rubber, styrene butadiene and acrylonitrile. These elastomers are specifically formulated to match the polarity of the ultra-high-molecular-weight-polyethylene as closely as possible.

Because of the UHMWPE and it curing process, the outer covering of the hose of this invention is capable of being cleaned by decontaminating agents (i.e. DS2, bleach, strong bases, Etc) without damage or deterioration of the hose cover.

Once cleaned or decontaminated, the outer cover is clean enough for a persons' bare, unprotected hand to contact without risk of chemical or biological injury or infection.

The invention's hose is formulated for various fluids/gasses, and provides a transport for the water, air, oxygen, etc, without content contamination. The hose of this invention is extremely useful for transporting/distributing water and supplying oxygen or air for aviators, divers, and ground troops.

Hose body 10 is chosen from a wide range of materials obvious to those of ordinary skill in the art, including, but not limited to: Acrylonitrile, Butyl, Chloroprene, S8R, EPDM, Natural, Silicone & UITON Polymers, plus many plastics.

The elastomer used with the UHMWPE should be compatible with both the UHMWPE and the hose body polymer.

Figure 2:
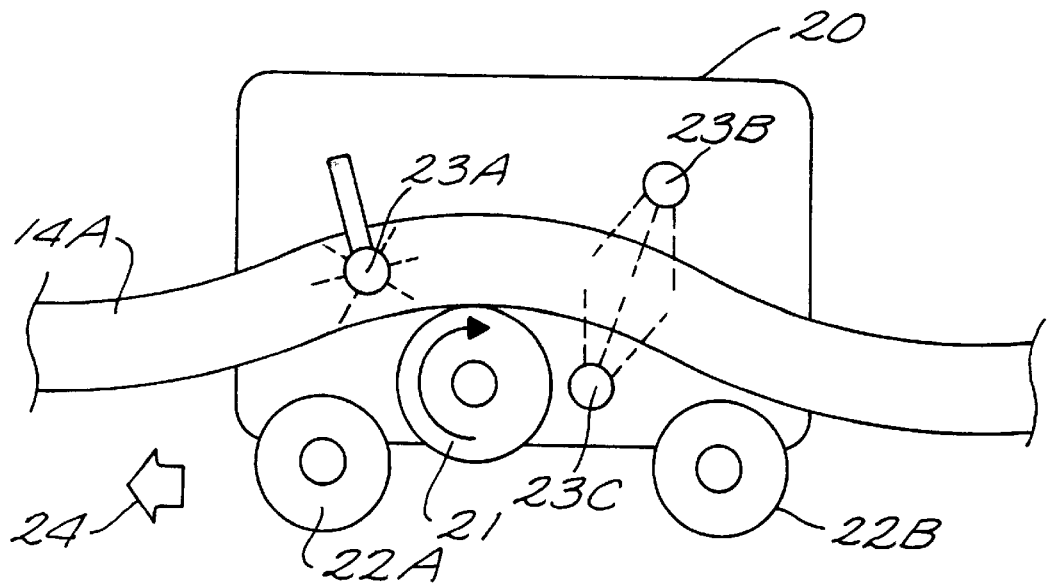
FIG. 2 illustrates an embodiment of the invention used to de-contaminate a hose.

FIG. 2 illustrates an embodiment of the invention used to de-contaminate a hose.

Hose 14A is cradled by roller 21. While hose 14A remains stationary, carriage 20 is moved as indicated by arrow 24; carriage 20 raises hose 14A from the ground.

Once raised, spray 23A dispenses a decontaminating liquid onto the side of hose 14A (another spray mechanism addresses the opposing side of hose 14A). Spray 23B and spray 23C treat the top and bottom of hose 14A.

Carriage 20 contains a reservoir which holds the decontaminating liquid.

In this manner, the carriage is pulled along (on wheels 22a and 22B) the path of hose 14A and hose 14A is treated for chemical and biological attacks.

Figure 3:
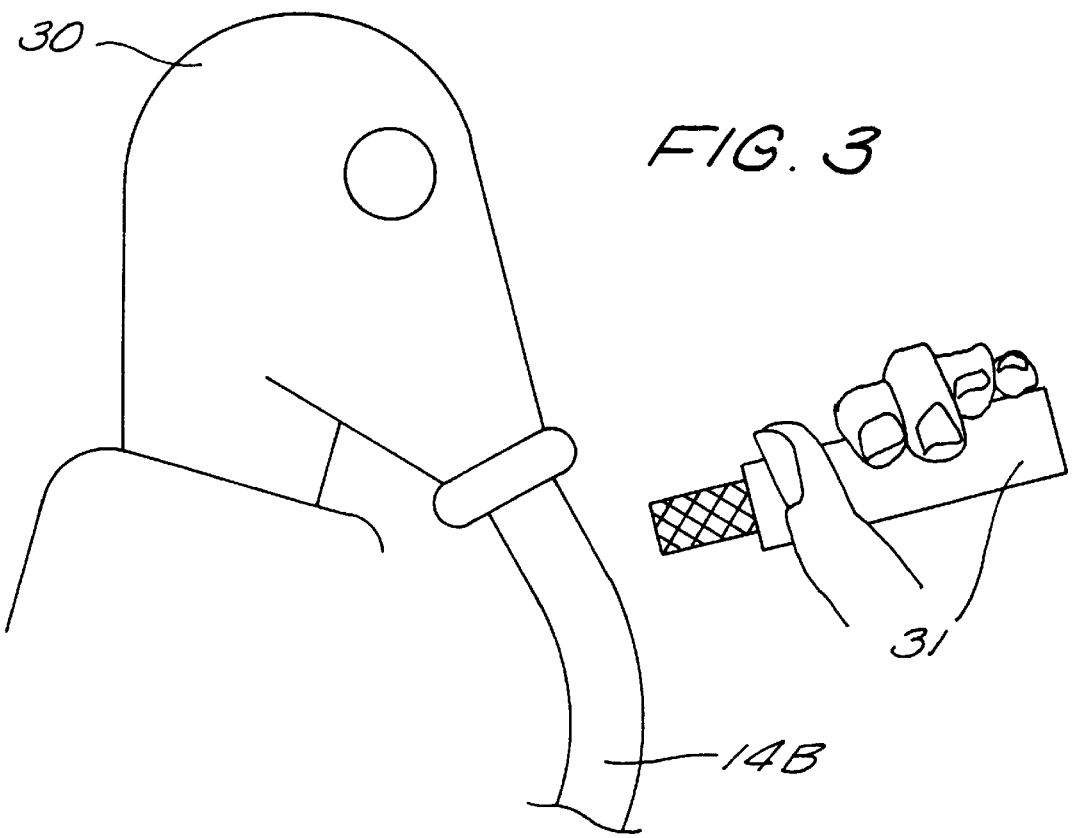
FIG. 3 illustrates an embodiment of the invention where a hand-held applicator is used for the de-contamination of a breathing hose.

FIG. 3 illustrates an embodiment of the invention where a hand-held applicator is used for the de-contamination of a breathing hose.

User 30 is contained within a protective suit and is supplied oxygen via hose 14B. Should hose 14B be subjected to either chemical or biological attack, user 30 is able to apply a decontaminating liquid via dispenser 31. Dispenser 31 has a "sponge type" applicator so that the decontaminating liquid contacts hose 14A.

Figure 4A:
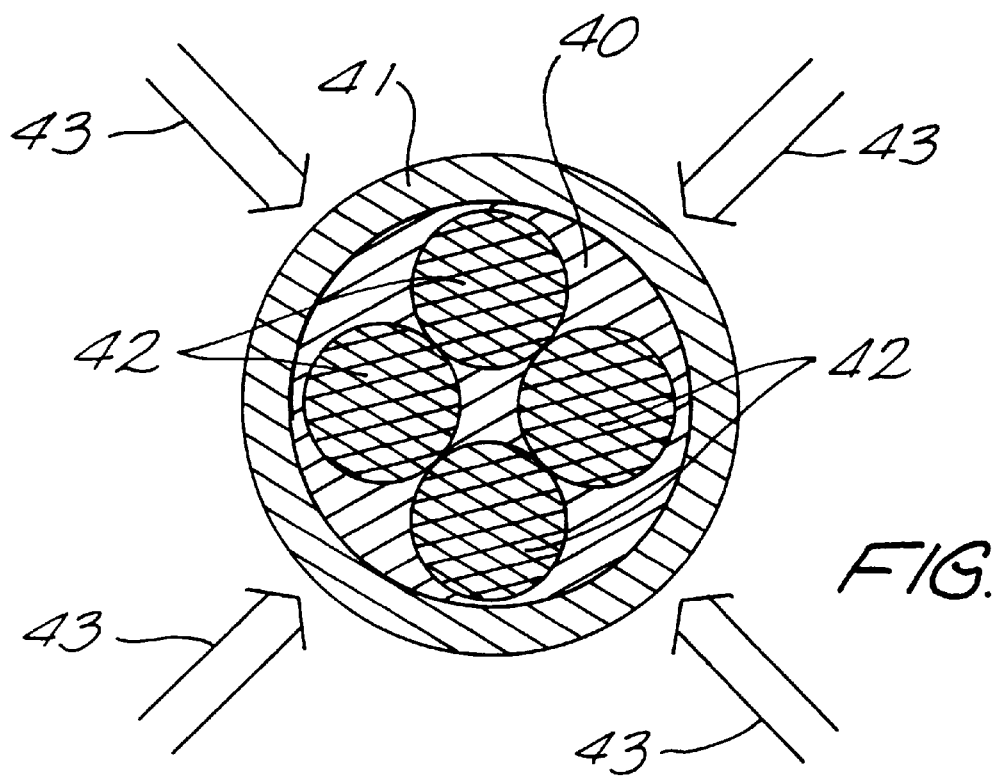
FIGS. 4A and 4B illustrate an embodiment of the invention used for the protection of electrical wires.
Figure 4B:
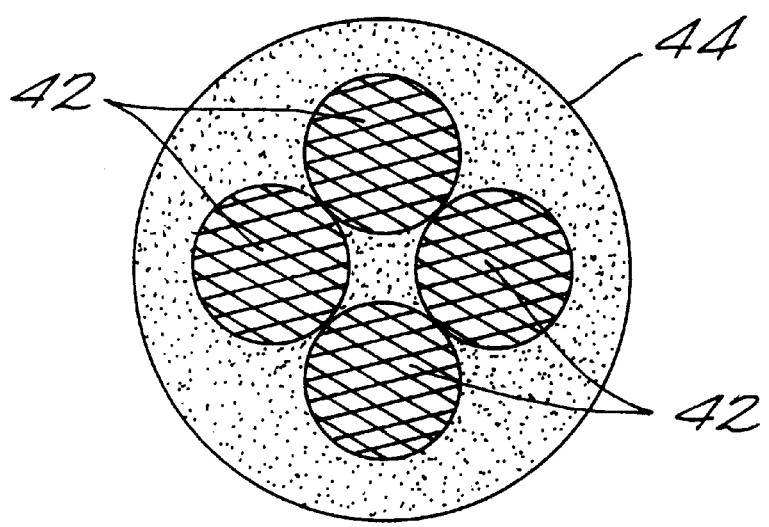

FIGS. 4A and 4B illustrate the creation of an embodiment of the invention used for the protection of electrical wires.

As shown, an inner group of strands of electrically conductive material 42 is contained within an uncured casing 40. Around uncured casing 40 is an uncured barrier wrap 41. Uncured barrier wrap 41 is identical to the barrier wrap discussed relative to the prior figures.

The assembly is then cured 43 using high heat and pressure to yield a blended and protected wire casing 44 (FIG. 4B).

Wire casing 44 protects the wires 42 and permits easy cleansing using a variety of apparatus such as that shown in FIG. 2.

It is clear that the present invention creates a highly advanced hose which is resistant to chemical and biological attacks.

What is claimed is:

1. A technique for manufacturing a hose for the transmission of gases comprising the steps of:
   a) creating an uncured barrier wrap of elastomer and ultra-high-molecular-weight-polyethylene;
   b) wrapping said uncured barrier wrap around an uncured hose body, wherein a polarity of said elastomer approximates a polarity of said uncured hose body; and,
   c) curing said barrier wrap and said hose body under high temperature such that said ultra-high-molecular-weight-polyethylene is melted.

2. The technique according to claim 1, further including the step of, prior to the step of curing, wrapping a curing wrap around said barrier wrap.

3. The technique according to claim 2, wherein the step of curing includes the step of applying high pressure to compress said barrier wrap during the step of curing.

4. The technique according to claim 3, further including the step of choosing a material for said uncured hose body such that, once cured, said hose body does not react with a chosen gas to be communicated by said hose.

5. The technique according to claim 1, further including the step of assuring that the barrier wrap is less than 0.025 inches thick.

6. A hose for the transmission of gases comprising:
   a) a hose body forming a channel;
   b) a barrier wrap including an elastomer and an ultra-high-molecular-weight-polyethylene, said barrier wrap totally encircling said hose body, wherein a polarity of said elastomer approximates a polarity of said hose body; and,
   c) wherein said hose body and said barrier wrap are cured as a single assembly.

7. The hose according to claim 6, wherein said hose body and said barrier wrap are cured under high temperature and high pressure to reduce a porosity of said barrier wrap once cured.

8. The hose according to claim 7, wherein said barrier wrap is less than 0.025 inches thick.

9. The hose according to claim 7, further including a curing wrap positioned around said barrier wrap and cured with said barrier wrap.

10. The hose according to claim 9, wherein said hose body, once cured, does not react with a chosen gas to be communicated by said hose.

11. A system for transmission of fluids comprising:
   a) a hose adapted to carry gas, said hose having,
      1) a hose body forming a channel, and,
      2) a barrier wrap including an elastomer and an ultra-high-molecular-weight-polyethylene, said barrier wrap totally encircling said hose body, wherein a polarity of said elastomer approximates a polarity of said hose body, and,
   wherein said hose body and said barrier wrap are cured as a single assembly; and,
   b) means for applying a cleansing agent to said barrier wrap, said cleansing agent adapted to neutralize toxic elements deposited on said barrier wrap by an enemy.

12. The system according to claim 11, wherein said barrier wrap and said hose body are cured using high temperature and high pressure.

13. An electrical conductor comprising:
   a) a bundle having at least two strands of electrically conductive material, each of said strands within said bundle being insulated from the others, said bundle being contained within an uncured casing;
   b) a barrier wrap including an elastomer and an ultra-high-molecular-weight-polyethylene, said barrier wrap totally encircling said uncured casing, wherein a polarity of said elastomer approximates a polarity of said uncured casing; and,
   c) wherein said uncured casing and said barrier wrap are cured as a single assembly.

14. The electrical conductor according to claim 13, wherein said uncured casing and said barrier wrap are cured under high temperature and high pressure to reduce a porosity of said barrier wrap once cured.

15. The electrical conductor according to claim 14, wherein said barrier wrap is less than 0.025 inches thick.

16. The electrical conductor according to claim 14, further including a curing wrap positioned around said barrier wrap and cured with said barrier wrap.

* * * * *